(12) United States Patent
Terao et al.

(10) Patent No.: US 12,319,822 B2
(45) Date of Patent: Jun. 3, 2025

(54) INK JET COMPOSITION AND INK JET RECORDING METHOD

(71) Applicant: SEIKO EPSON CORPORATION, Tokyo (JP)

(72) Inventors: Koichi Terao, Suwa (JP); Soichi Yamazaki, Shiojiri (JP); Nikako Tsukiji, Matsumoto (JP); Harunobu Komatsu, Matsumoto (JP); Koji Horiba, Atsugi (JP)

(73) Assignee: SEIKO EPSON CORPORATION (JP)

( * ) Notice: Subject to any disclaimer, the term of this patent is extended or adjusted under 35 U.S.C. 154(b) by 330 days.

(21) Appl. No.: 17/885,715

(22) Filed: Aug. 11, 2022

(65) Prior Publication Data

US 2023/0051678 A1  Feb. 16, 2023

(30) Foreign Application Priority Data

Aug. 12, 2021 (JP) ................... 2021-131781

(51) Int. Cl.
  *C09D 11/328* (2014.01)
  *B41J 2/01* (2006.01)
  *C09D 167/00* (2006.01)

(52) U.S. Cl.
  CPC .............. *C09D 11/328* (2013.01); *B41J 2/01* (2013.01); *C09D 167/00* (2013.01)

(58) Field of Classification Search
  CPC .. B41J 2/01; B41J 2/17; C09D 167/00; C09D 177/12; C09D 11/30; C09D 11/104; C09D 11/10
  See application file for complete search history.

(56) References Cited

U.S. PATENT DOCUMENTS 10,639,919 B2 * 5/2020 Arai ..................... C09D 11/54
2020/0308431 A1 10/2020 Yamazaki et al.

FOREIGN PATENT DOCUMENTS

JP      2020-158645 A   10/2020

* cited by examiner

*Primary Examiner* — Thinh H Nguyen
(74) *Attorney, Agent, or Firm* — Harness, Dickey & Pierce, P.L.C.

(57) ABSTRACT

An ink jet composition of the present disclosure includes: water; a polyester resin having sulfo groups; a colorant; and a high molecular weight dispersant having anionic groups, the colorant is contained in particles formed from a material containing the polyester resin, and a rate X1 [percent on molar basis] of the sulfo groups to all constituent monomers of the polyester resin is lower than a rate X2 [percent on molar basis] of the anionic groups to all constituent monomers of the high molecular weight dispersant.

12 Claims, 1 Drawing Sheet

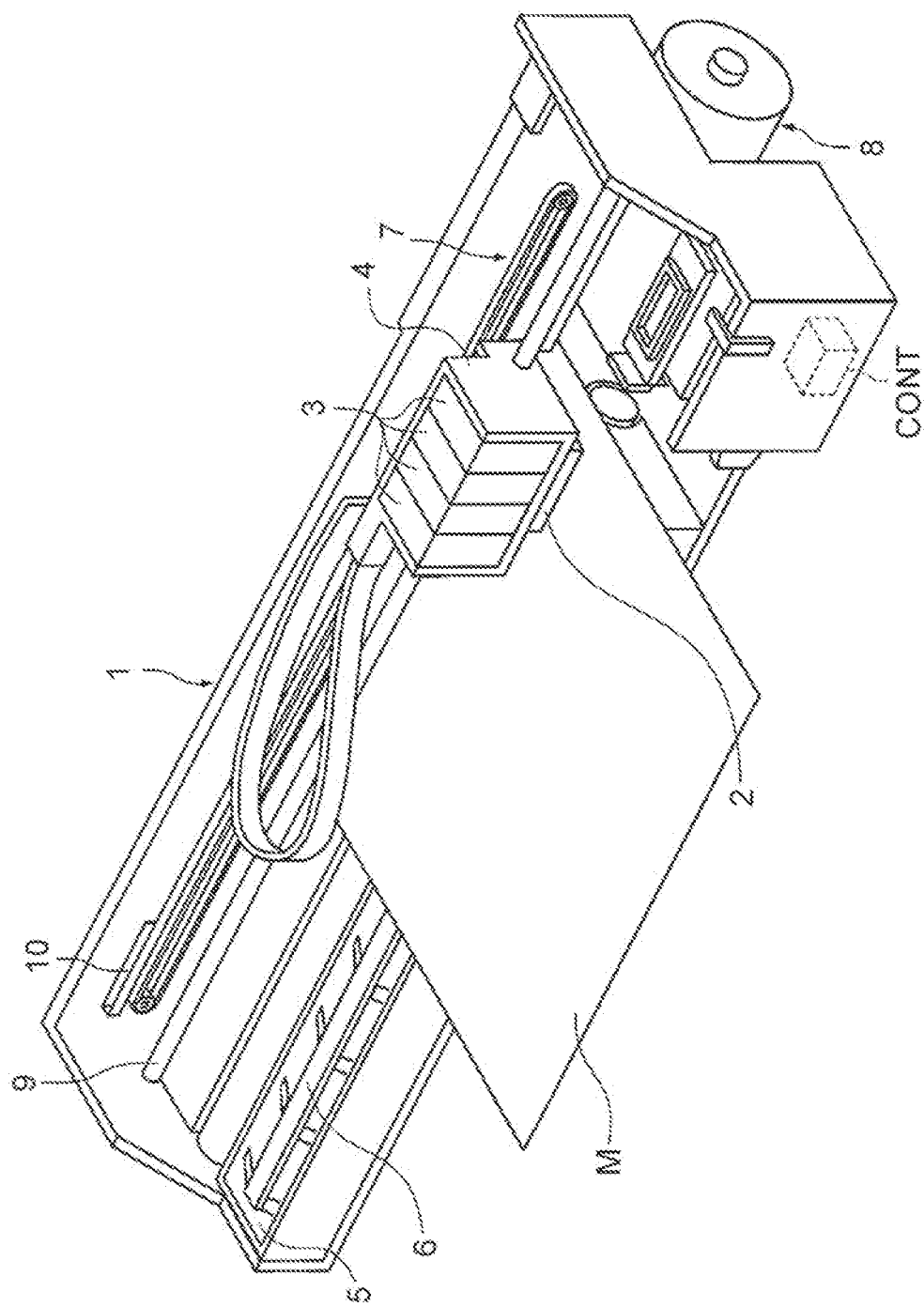

INK JET COMPOSITION AND INK JET RECORDING METHOD

The present application is based on, and claims priority from JP Application Serial Number 2021-131781, filed Aug. 12, 2021, the disclosure of which is hereby incorporated by reference herein in its entirety.

BACKGROUND

1. Technical Field

The present disclosure relates to an ink jet composition and an ink jet recording method.

2. Related Art

In recent years, application of ink jet printing has been expanded, and besides application for office-use and home-use printers, the ink jet printing has also been applied to commercial printing, textile printing, and the like.

In addition, the ink jet printing has been applied not only to paper but also to various types of recording media, such as a cloth, a film, and cardboard.

In view of handleability and safety, although a water-based ink has been desired to be used, on the other hand, by a water-based ink, a sufficiently excellent coating film strength is difficult to obtain. Hence, although an ink jet ink containing a resin material has been used, when a usual polyester or the like is used, a dispersion stability of a resin material and the like contained in the ink jet ink is inferior, and a problem in that an ejection stability by an ink jet method is degraded may occur in some cases.

In order to overcome the problem as described above, an ink jet ink containing a polyester resin having highly hydrophilic sulfo groups has been proposed (for example, see JP-A-2020-158645).

When the ink jet ink as described above is used, although the dispersion stability of the resin material and the like contained in the ink jet ink can be improved, a problem in that a color development property is degraded may arise. When a solid content concentration is increased to improve the color development property, a problem in that the dispersion stability of the resin material and the like contained in the ink jet ink is degraded may occur.

That is, there has been a problem in that the dispersion stability of the resin material and the like contained in the ink jet ink and the color development property thereof cannot be obtained at the same time.

SUMMARY

The present disclosure is made to overcome the problem described above and can be realized as the following application examples.

An ink jet composition according to an application example of the present disclosure comprises: water; a polyester resin having sulfo groups; a colorant; and a high molecular weight dispersant having anionic groups, the colorant is contained in particles formed from a material containing the polyester resin, and a rate X1 [percent on molar basis] of the sulfo groups to all constituent monomers of the polyester resin is lower than a rate X2 [percent on molar basis] of the anionic groups to all constituent monomers of the high molecular weight dispersant.

In addition, in an ink jet composition according to another application example of the present disclosure, the colorant includes at least one selected from the group consisting of a sublimation dye, an oil dye, and a dispersive dye.

In addition, in an ink jet composition according to another application example of the present disclosure, the polyester resin has a number average molecular weight of 4,000 to 20,000.

In addition, in an ink jet composition according to another application example of the present disclosure, the X1 is 0.5 to 2.5 percent on molar basis.

In addition, in an ink jet composition according to another application example of the present disclosure, the anionic groups are sulfo groups or carboxy groups.

In addition, in an ink jet composition according to another application example of the present disclosure, the high molecular weight dispersant has a number average molecular weight lower than a number average molecular weight of the polyester resin.

In addition, in an ink jet composition according to another application example of the present disclosure, a content of the high molecular weight dispersant with respect to 100 parts by mass of the polyester resin is 5 to 25 parts by mass.

In addition, in an ink jet composition according to another application example of the present disclosure, the high molecular weight dispersant is a polyester-based high molecular weight dispersant having sulfo groups as the anionic groups, and the X2 is 4.0 to 7.5 percent on molar basis.

An ink jet recording method according to an application example of the present disclosure comprises: an ejection step of ejecting the ink jet composition of the present disclosure by an ink jet method.

In addition, an ink jet recording method according to another application example of the present disclosure further comprises, after the ejection step: a heating step of heating a recording medium to which the ink jet composition is adhered.

In addition, in an ink jet recording method according to another application example of the present disclosure, the recording medium has a temperature of 100° C. to 160° C. in the heating step.

BRIEF DESCRIPTION OF THE DRAWINGS

FIGURE a schematic perspective view of a recording apparatus of a preferable embodiment.

DESCRIPTION OF EXEMPLARY EMBODIMENTS

Hereinafter, preferable embodiments of the present disclosure will be described in detail.

1. Ink Jet Composition

First, an ink jet composition of the present disclosure will be described.

The ink jet composition of the present disclosure includes water; a polyester resin having sulfo groups; a colorant; and a high molecular weight dispersant having anionic groups. In addition, the colorant described above is contained in particles formed from a material containing the polyester resin, and a rate X1 [percent on molar basis] of the sulfo groups to all constituent monomers of the polyester resin is lower than a rate X2 [percent on molar basis] of the anionic groups to all constituent monomers of the high molecular weight dispersant.

When the conditions as described above are satisfied, a dispersion stability of a solid content in the ink jet composition and a storage stability of the ink jet composition can be made excellent, and in addition, a color development property of a recorded portion to be formed using the ink jet composition can also be made excellent. In particular, an excellent color development property can be obtained on various types of recording media. In addition, an ejection stability of the ink jet composition by an ink jet method can also be made excellent. In addition, a fixing property and an adhesion strength of the recorded portion to be formed using the ink jet composition can be made excellent. In addition, the ink jet composition of the present disclosure can be applied to a method for manufacturing a recorded matter including no transfer step which will be described later in detail and is preferable in terms of improvement in productivity of the recorded matter, reduction in production cost thereof, energy saving, and the like.

The reasons the excellent effects as described above can be obtained are believed as follows.

That is, since the polyester resin forming the particles is a resin having sulfo groups, a hydrophilic property of the particles can be made excellent. Furthermore, since the polyester resin having sulfo groups and the high molecular weight dispersant having anionic groups are used in combination, while the rate of the sulfo groups of the polyester resin is suppressed, the effects as described above can be obtained. In addition, since the rate of the sulfo groups of the polyester resin is suppressed, an affinity between the colorant generally having a low hydrophilic property and the polyester resin can be improved, and the particles formed from the material containing the polyester resin can be preferably colored by the colorant. In other words, in the particles formed from the material containing the polyester resin which is dispersed in the ink jet composition, the colorant can be preferably contained. As a result, the dispersion stability of the particles in the ink jet composition, the storage stability of the ink jet composition, and the ejection stability of the ink jet composition by an ink jet method can be made excellent, and in addition, the color development property of the recorded portion to be formed using the ink jet composition can also be made excellent.

In addition, since the colorant is applied to a recording medium while the colorant preferably colors the resin material, the fixing property of the recorded portion of the recorded matter to be manufactured can be made excellent, and the colorant can be preferably prevented, for example, from unfavorably falling from the recorded matter and can be stably held in the recorded matter. Hence, for example, even when a heat treatment, such as washing/cleaning using hot water, heat drying by a dryer, or ironing, is performed, the colorant is effectively prevented from unfavorably being scattered out of the recorded matter, and as a result, durability of the recorded matter can be made particularly excellent.

In addition, when a dye is contained as the colorant, the effects as described above can be more significantly obtained.

On the other hand, when the conditions described above are not satisfied, satisfactory results cannot be obtained.

For example, even when the high molecular weight dispersant having anionic groups is used, if the polyester resin having sulfo groups is not included, the hydrophilic property of the particles contained in the ink jet composition cannot be sufficiently enhanced, and the dispersion stability of the solid content in the ink jet composition, the storage stability of the ink jet composition, and the ejection stability thereof by an ink jet method are degraded.

In addition, even when the polyester resin having sulfo groups is included, if the high molecular weight dispersant having anionic groups is not included, as long as the rate of the sulfo groups contained in the polyester resin is not increased, the effects as described above cannot be sufficiently obtained. In addition, when the rate of the sulfo groups contained in the polyester resin is increased, since the affinity between the colorant generally having a low hydrophilic property and the polyester resin cannot be made sufficiently excellent, the colorant is difficult to be contained in the particles formed from the material containing the polyester resin at a sufficient rate, and as a result, the color development property of the recorded portion to be formed using the ink jet composition cannot be made sufficiently excellent.

In addition, in this specification, the ink jet composition is a concept which includes, besides an ink itself to be ejected by an ink jet method, an undiluted solution to be used for preparation of the ink. In other words, the ink jet composition of the present disclosure may be a composition itself to be ejected by an ink jet method or may be a composition to be ejected by an ink jet method after being processed by a treatment, such as dilution. As the ink jet method, for example, there may be mentioned a charge deflection method, a continuous method, or an on-demand method, such as a piezoelectric method or a bubble jet (registered trademark) method.

1-1. Water

The ink jet composition of the present disclosure includes water. The water primarily has a function to impart the fluidity to the ink jet composition and for example, functions as a dispersion medium of the particles.

As the water, for example, pure water, such as reverse osmosis (RO) water, distilled water, or ion exchange water, may be used.

Although a lower limit of a content of the water in the ink jet composition is not particularly limited, the lower limit described above is preferably 30.0 percent by mass, more preferably 35.0 percent by mass, and further preferably 40.0 percent by mass. In addition, although an upper limit of the content of the water in the ink jet composition is not particularly limited, the upper limit described above is preferably 90.0 percent by mass, more preferably 85.0 percent by mass, and further preferably 80.0 percent by mass.

Accordingly, a viscosity of the ink jet composition can be more reliably adjusted to a preferable value. In addition, the dispersion stability of the particles in the ink jet composition can be made more excellent. As a result, the ejection stability of the ink jet composition by an ink jet method can be made more excellent.

1-2. Colorant

The ink jet composition of the present disclosure includes a colorant. The colorant colors a recording medium and is a component having a significant influence on the appearance of the recorded matter.

As the colorant, for example, various types of pigments, such as organic pigments and inorganic pigments, and various types of dyes may be mentioned, and one selected from those mentioned above may be used alone, or at least two types thereof may be used in combination.

As the organic pigment, for example, there may be mentioned an azo pigment, such as an azo lake, an insoluble azo pigment, a condensed azo pigment, or a chelate azo pigment; a polycyclic pigment, such as a phthalocyanine pigment, a perylene pigment, a perinone pigment, an anthraquinone pigment, a quinacridone pigment, a dioxazine pigment, a thioindigo pigment, an isoindolinone pigment, or a quinophthalone pigment; a dye lake, such as a basic dye type lake or an acidic dye type lake; a nitro pigment, a nitroso pigment, an aniline black, or a daylight fluorescent pigment.

As the inorganic pigment, for example, a titanium oxide, an iron oxide, or a carbon black may be mentioned. As the carbon black, for example, a carbon black manufactured by a known method, such as a contact method, a furnace method, or a thermal method, may be used.

As the dye, for example, a sublimation dye, an oil dye, a dispersive dye, a fluorescent dye, a reactive dye, an acidic dye, a sulfide dye, a vat dye, or a cationic dye may be mentioned.

Among those mentioned above, a colorant containing at least one selected from the group consisting of a sublimation dye, an oil dye, and a dispersive dye is preferable.

Accordingly, the particles described above can be more preferably colored, and the color development property of the recorded portion to be formed using the ink jet composition can be made more excellent.

As the dispersive dye and the sublimation dye, for example, there may be mentioned C.I. Disperse Yellow 1, 3, 4, 5, 7, 9, 13, 23, 24, 30, 33, 34, 42, 44, 49, 50, 51, 54, 56, 58, 60, 61, 63, 64, 66, 68, 71, 74, 76, 79, 82, 83, 85, 86, 88, 90, 91, 93, 98, 99, 100, 104, 108, 114, 116, 118, 119, 122, 124, 126, 135, 140, 141, 149, 154, 160, 162, 163, 164, 165, 179, 180, 182, 183, 184, 186, 192, 198, 199, 201, 202, 204, 210, 211, 215, 216, 218, 224, 227, 231, or 232; C.I. Disperse Orange 1, 3, 5, 7, 11, 13, 17, 20, 21, 25, 29, 30, 31, 32, 33, 37, 38, 42, 43, 44, 45, 46, 47, 48, 49, 50, 53, 54, 55, 56, 57, 58, 59, 60, 61, 66, 71, 73, 76, 78, 80, 89, 90, 91, 93, 96, 97, 119, 127, 130, 139, or 142; C.I. Disperse Red 1, 4, 5, 7, 11, 12, 13, 15, 17, 27, 43, 44, 50, 52, 53, 54, 55, 56, 58, 59, 60, 65, 72, 73, 74, 75, 76, 78, 81, 82, 86, 88, 90, 91, 92, 93, 96, 103, 105, 106, 107, 108, 110, 111, 113, 117, 118, 121, 122, 126, 127, 128, 131, 132, 134, 135, 137, 143, 145, 146, 151, 152, 153, 154, 157, 159, 164, 167, 169, 177, 179, 181, 183, 184, 185, 188, 189, 190, 191, 192, 200, 201, 202, 203, 205, 206, 207, 210, 221, 224, 225, 227, 229, 239, 240, 257, 258, 277, 278, 279, 281, 288, 298, 302, 303, 310, 311, 312, 320, 324, 328, or 364; C.I. Disperse Violet 1, 4, 8, 23, 26, 27, 28, 31, 33, 35, 36, 38, 40, 43, 46, 48, 50, 51, 52, 56, 57, 59, 61, 63, 69, or 77; C.I. Disperse Green 9; C.I. Disperse Brown 1, 2, 4, 9, 13, or 19; C.I. Disperse Blue 3, 7, 9, 14, 16, 19, 20, 24, 26, 27, 35, 43, 44, 54, 55, 56, 58, 60, 62, 64, 71, 72, 73, 75, 79, 81, 82, 83, 87, 91, 92, 93, 94, 95, 96, 102, 106, 108, 112, 113, 115, 118, 120, 122, 125, 128, 130, 139, 141, 142, 143, 146, 148, 149, 153, 154, 158, 165, 167, 171, 173, 174, 176, 181, 183, 185, 186, 187, 189, 197, 198, 200, 201, 205, 207, 211, 214, 224, 225, 257, 259, 267, 268, 270, 284, 285, 287, 288, 291, 293, 295, 297, 301, 315, 330, 333, 359, or 360; or C.I. Disperse Black 1, 3, 10, or 24.

As the oil dye, for example, there may be mentioned C.I. Solvent Black 3, 7, 27, 29, or 34; C.I. Solvent Yellow 14, 16, 19, 29, 56, or 82; C.I. Solvent Red 1, 3, 8, 18, 24, 27, 43, 51, 72, 73, 132, or 218; C.I. Solvent Violet 3; C.I. Solvent Blue 2, 5, 11, or 70; C.I. Solvent Green 3 or 7; or C.I. Solvent Orange 2.

In addition, as the fluorescent dye, for example, there may be mentioned C.I. Disperse Red 364, C. I. Disperse Red 362, C.I. Vat Red 41, C.I. Disperse Yellow 232, C.I. Disperse Yellow 184, C.I. Disperse Yellow 82, or C.I. Disperse Yellow 43.

As the reactive dye, for example, there may be mentioned a yellow dye, such as C.I. Reactive Yellow 2, 3, 18, 81, 84, 85, 95, 99, or 102; an orange dye, such as C.I. Reactive Orange 5, 9, 12, 13, 35, 45, or 99; a brown dye, such as C.I. Reactive Brown 2, 8, 9, 17, or 33; a red dye, such as C.I. Reactive Red 1, 3, 4, 13, 15, 24, 29, 31, 33, 120, 125, 151, 206, 218, 226, or 245; a violet dye, such as C.I. Reactive Violet 24; a blue dye, such as C.I. Reactive Blue 2, 5, 10, 13, 14, 15, 15:1, 21, 49, 63, 71, 72, 75, 162, or 176, or C.I. Reactive Blue 4, 19, or 198; a green dye, such as C.I. Reactive Green 5, 8, or 19; or a black dye, such as C.I. Reactive Black 1, 8, 23, or 39.

A lower limit of a content of the colorant in the ink jet composition is preferably 0.1 percent by mass, more preferably 0.2 percent by mass, and further preferably 0.3 percent by mass. In addition, an upper limit of the content of the colorant in the ink jet composition is preferably 10.0 percent by mass, more preferably 7.0 percent by mass, and further preferably 5.0 percent by mass.

Accordingly, the color development property and optical density of the recorded portion of the recorded matter to be manufactured using the ink jet composition can be made more excellent, and in addition, for example, generation of unfavorable color irregularity in the recorded matter can be more effectively prevented.

At least part of the colorant forming the ink jet composition may be contained in the particles described above, and a colorant not contained in the particles may also be included.

However, a rate of the colorant not contained in the particles to the total colorant included in the ink jet composition is preferably 10 percent on mass basis or less, more preferably 5 percent on mass basis or less, and further preferably 1 percent on mass basis or less.

1-3. Polyester Resin Having Sulfo Groups

The ink jet composition of the present disclosure includes a polyester resin having sulfo groups in its molecule. Hereinafter, the polyester resin having sulfo groups in its molecule as described above is also called "sulfo group-containing polyester resin" in some cases. In the recorded matter to be manufactured using the ink jet composition, the sulfo group-containing polyester resin has not only a function to improve the fixing property and fastness of the recorded portion but also a function to improve texture and touch feeling. In addition, the polyester resin described above also has a function to improve a color development property of the colorant. In addition, since having an excellent hydrophilic property, the sulfo group-containing polyester resin has a function to improve the dispersion stability of the solid content in the ink jet composition including water and the storage stability of the ink jet composition, and as a result, the polyester resin described above also has a function to improve the ejection stability of the ink jet composition.

The polyester is a generic name of a high molecular weight material having an ester bond in its main chain, and in general, the polyester includes a chemical structure formed by dehydration condensation between a polyol component having hydroxy groups in its molecule and a polycarboxylic acid component having carboxy groups in its molecule.

The sulfo group-containing polyester resin preferably has sulfo groups and also includes a diol component and a dicarboxylic acid component. The sulfo group-containing polyester resin may also include, besides the diol component and the dicarboxylic acid component, an at least trivalent polyalcohol component and an at least trivalent polyvalent carboxylic acid component.

The sulfo group may be included in any position in the sulfo group-containing polyester resin and may be included, for example, in the diol component, the dicarboxylic acid component, or the position other than those mentioned above; however, the sulfo group is preferably included in the dicarboxylic acid component. In other words, the sulfo group-containing polyester resin preferably includes a dicarboxylic acid component having a sulfonated chemical structure.

1-3-1. Diol Component

As the diol component forming the sulfo group-containing polyester resin, for example, there may be mentioned an aliphatic diol, such as 1,3-propanediol, methyl propanediol, neopentyl glycol, methyl ethyl propanediol, diethyl propanediol, butyl ethyl propanediol, ethylene glycol, 1,2-propanediol, 2,3-butanediol, 1,4-butanediol, 1,5-pentanediol, 1,6-hexanediol, 3-methyl-1,5-pentanediol, diethylene glycol, dipropylene glycol, a polyethylene glycol, a polypropylene glycol, 1,4-cyclohexanediol, or cyclohexanedimethanol; an aromatic diol, such as 1,4-benzenedimethanol; or a compound in which a sulfo group is incorporated in one of the diols mentioned above, and one selected from those diols mentioned above may be used alone, or at least two types thereof may be used in combination.

1-3-2. Dicarboxylic Acid Component

As the dicarboxylic acid component forming the sulfo group-containing polyester resin, a component having at least two carboxy groups in its molecule may be used.

As the dicarboxylic acid component, the sulfo group-containing polyester resin may contain only one type component but preferably contains at least two types of components.

Accordingly, since the amorphousness of the sulfo group-containing polyester resin is enhanced, for example, the crystallization thereof in the ink jet composition or in the recorded portion to be formed using the ink jet composition can be preferably prevented, and the storage stability of the ink jet composition and the reliability of the recorded matter can be made more excellent. In particular, when an aromatic dicarboxylic acid which will be described later is contained as the dicarboxylic acid component, in general, the crystallization as described above is liable to occur; however, since the sulfo group-containing polyester resin contains at least two types of dicarboxylic acid components, while the crystallization is effectively prevented, advantages realized by using the aromatic dicarboxylic acid which will be described later can be obtained.

Although the dicarboxylic acid component forming the sulfo group-containing polyester resin may be an aliphatic dicarboxylic acid, an aromatic dicarboxylic acid is preferably at least contained.

Accordingly, a resin strength can be increased. In addition, for example, a hydrophobic property of the sulfo group-containing polyester resin can be appropriately increased, and even when the ink jet composition is stored, for example, in a high-temperature environment, the sulfo group-containing polyester resin can be effectively prevented from being unfavorably dissolved in a dispersion medium containing water as a primary component. In addition, a water resistance of the recorded matter to be manufactured using the ink jet composition can also be made more excellent. In addition, when the ink jet composition includes a dye as the colorant, the affinity between the sulfo group-containing polyester resin and the colorant can be further enhanced, and the color development property is made particularly excellent. In addition, the colorant can be preferably contained in the particles described above, and the effects as described above can be more significantly obtained.

As the aromatic dicarboxylic acid, for example, there may be mentioned an aromatic dicarboxylic acid, such as terephthalic acid, isophthalic acid, ortho-phthalic acid, 1,5-naphthalene dicarboxylic acid, 2,6-naphthalene dicarboxylic acid, 2,7-naphthalene dicarboxylic acid, or diphenic acid; or a compound in which a sulfo group is incorporated in one of the aromatic dicarboxylic acids mentioned above. Among those mentioned above, terephthalic acid, isophthalic acid, or a compound in which a sulfo group is incorporated therein is preferable.

A lower limit of a rate of the aromatic dicarboxylic acid to all the dicarboxylic acid components forming the sulfo group-containing polyester resin is preferably 0.4 percent on molar basis, more preferably 1.0 percent on molar basis, and further preferably 1.4 percent on molar basis. An upper limit of the rate of the aromatic dicarboxylic acid to all the dicarboxylic acid components forming the sulfo group-containing polyester resin is preferably 20.0 percent on molar basis, more preferably 15.0 percent on molar basis, and further preferably 10.0 percent on molar basis.

Accordingly, the hydrophilic property of the particles described above can be more appropriately adjusted, and the dispersion stability of the particles in the ink jet composition, the storage stability of the ink jet composition, and the color development property of the recorded portion of the recorded matter to be manufactured using the ink jet composition can be made more excellent. In addition, the water resistance, oil resistance, and the like of the recorded matter to be manufactured using the ink jet composition can also be made more excellent.

As the aliphatic dicarboxylic acid, for example, there may be mentioned an aliphatic dicarboxylic acid, such as succinic acid, adipic acid, azelaic acid, sebacic acid, dodecanedicarboxylic acid, fumaric acid, maleic acid, itaconic acid, hexahydrophthalic acid, tetrahydrophthalic acid, or cyclohexanedicarboxylic acid, or a compound in which a sulfo group is incorporated in one of the aliphatic dicarboxylic acids mentioned above.

When the sulfo group-containing polyester resin contains as the dicarboxylic acid, at least two types of components, terephthalic acid, isophthalic acid, and/or a compound in which a sulfo group is incorporated in terephthalic acid or isophthalic acid is preferably contained as the dicarboxylic acid.

Accordingly, although being different from each other, those compounds have the structures similar to each other, and hence, effects such that the compounds are likely to be compatible with each other and the amorphousness is enhanced are obtained.

In the sulfo group-containing polyester resin, a distribution of the sulfo groups in its molecule may be either uniform or non-uniform.

The polyester resin can be preferably synthesized by heating a mixture which contains, for example, an ester compound including a diol component and a dicarboxylic acid component and which also contains, if needed, a component such as a catalyst. As the ester compound of the dicarboxylic acid component, for example, a methyl ester or an ethyl ester may be preferably used. In addition, in a method for manufacturing the polyester resin as described above, when a component containing a sulfo group is used as a part of the monomer component, the sulfo group-containing polyester resin can be manufactured.

In addition, the sulfo group-containing polyester resin may be synthesized by a method in which after a first reaction step of heating a mixture which contains an ester compound including a diol component and a dicarboxylic acid component and which also contains, if needed, a component such as a catalyst is performed, a second reaction step is performed such that a monomer component having a sulfo group is added in the reaction system and then heated.

1-3-3. Other Components

The sulfo group-containing polyester resin may have constituent components other than the diol component and the dicarboxylic acid component described above. As the components described above, for example, there may be mentioned an at least trivalent polyalcohol component, an at least trivalent polycarboxylic acid component, a monovalent alcohol component in which one hydroxy group of a diol component is esterified, and/or a monovalent carboxylic acid component in which one carboxy group of a dicarboxylic acid component is esterified.

However, a content of the components other than the diol component and the dicarboxylic acid component in the sulfo group-containing polyester resin is preferably 20.0 percent by mass or less, more preferably 10.0 percent by mass or less, and further preferably 5.0 percent by mass or less.

The particles described above forming the ink jet composition may contain at least one type of sulfo group-containing polyester resin and may also contain at least two types of sulfo group-containing polyester resins.

1-3-4. Other Conditions

The sulfo group-containing polyester resin preferably satisfies the following conditions.

Although the rate of the number of moles of the sulfo groups contained in the sulfo group-containing polyester resin to the number of moles of all the constituent monomers of the sulfo group-containing polyester resin, that is, the X1, may be lower than the X2, that is, the rate of the number of moles of the anionic groups contained in the high molecular weight dispersant described above to the number of moles of all the constituent monomers of the high molecular weight dispersant, the X1 preferably satisfies the following conditions. That is, a lower limit of the X1 is preferably 0.5 percent on molar basis, more preferably 0.6 percent on molar basis, and further preferably 0.7 percent on molar basis. In addition, an upper limit of the X1 is preferably 2.5 percent on molar basis, more preferably 2.0 percent on molar basis, and further preferably 1.2 percent on molar basis.

Accordingly, while the dispersion stability of the particles in the ink jet composition, the storage stability of the ink jet composition, and the ejection stability of the ink jet composition by an ink jet method are made more excellent, the color development property of the recorded portion to be formed using the ink jet composition can be made more excellent. In addition, the water resistance of the recorded portion to be formed using the ink jet composition can also be made more excellent.

A lower limit of a number average molecular weight of the sulfo group-containing polyester resin is preferably 4,000, more preferably 5,000, and further preferably 6,000. In addition, an upper limit of the number average molecular weight of the sulfo group-containing polyester resin is preferably 20,000, more preferably 15,000, and further preferably 12,000.

Accordingly, while the fixing property of the recorded portion to be formed using the ink jet composition to a recording medium and the durability of the recorded matter to be manufactured using the ink jet composition are made sufficiently excellent, the dispersion stability of the particles in the ink jet composition, the storage stability of the ink jet composition, and the ejection stability of the ink jet composition by an ink jet method can be made more excellent.

A lower limit of an acid value of the sulfo group-containing polyester resin is preferably 1.0 KOHmg/g, more preferably 1.5 KOHmg/g, and further preferably 2.0 KOHmg/g. In addition, an upper limit of the acid value of the sulfo group-containing polyester resin is preferably 15.0 KOHmg/g, more preferably 10.0 KOHmg/g, and further preferably 5.0 KOHmg/g.

A lower limit of a glass transition temperature of the sulfo group-containing polyester resin is preferably 0° C., more preferably 25° C., and further preferably 40° C. In addition, an upper limit of the glass transition temperature of the sulfo group-containing polyester resin is preferably 90° C., more preferably 75° C., and further preferably 70° C.

Accordingly, the fixing property of the sulfo group-containing polyester resin to a recording medium and the durability of the recorded matter to be manufactured using the ink jet composition can be simultaneously enhanced to a higher level.

A lower limit of a content of the sulfo group-containing polyester resin in the ink jet composition is preferably 3.0 percent by mass, more preferably 4.0 percent by mass, and further preferably 4.5 percent by mass. In addition, an upper limit of the content of the sulfo group-containing polyester resin in the ink jet composition is preferably 35.0 percent by mass, more preferably 30.0 percent by mass, and further preferably 28.0 percent by mass.

When the content of the colorant in the ink jet composition and the content of the sulfo group-containing polyester resin in the ink jet composition are represented by $X_C$ [percent by mass] and $X_P$ [percent by mass], respectively, a lower limit of $X_P/X_C$ is preferably 3.0, more preferably 3.5, and further preferably 4.0. In addition, an upper limit of $X_P/X_C$ is preferably 30.0, more preferably 20.0, and further preferably 15.0.

Accordingly, the color development property of the recorded portion to be formed using the ink jet composition can be made more excellent. In addition, the fixing property of the recorded portion to a recording medium can be made more excellent, and when the recorded matter manufactured using the ink jet composition is processed by a heat treatment, such as washing/cleaning using hot water, heat drying by a dryer, or ironing, the colorant can be effectively prevented from being unfavorably diffused out of the recorded matter.

At least part of the sulfo group-containing polyester resin forming the ink jet composition may form particles containing the colorant, and the ink jet composition may further contain, for example, particles which contain no colorant and which are formed from the sulfo group-containing polyester resin.

However, a rate of the sulfo group-containing polyester resin configured not to form the particles described above to the total sulfo group-containing polyester resin included in the ink jet composition is preferably 10 percent on mass basis or less, more preferably 5 percent on mass basis or less, and further preferably 1 percent on mass basis or less.

1-4. High Molecular Weight Dispersant Having Anionic Groups

The ink jet composition includes a high molecular weight dispersant having anionic groups. Hereinafter, the high molecular weight dispersant having anionic groups as described above is called "anionic group-containing high molecular weight dispersant" in some cases. When being used together with the sulfo group-containing polyester resin described above, the anionic group-containing high molecular weight dispersant has a function to enhance the dispersion stability of the solid content in the ink jet composition including water and the storage stability of the ink jet composition, and as a result, the anionic group-containing high molecular weight dispersant has a function to improve the ejection stability of the ink jet composition.

The anionic group-containing high molecular weight dispersant may be a high molecular weight dispersant having anionic functional groups, and although a basic skeleton of the anionic group-containing high molecular weight dispersant is not particularly limited, for example, a polyester skeleton, a (meth)acrylic-based skeleton, a styrene-(meth) acrylic-based skeleton, or a styrene-maleic acid-based skeleton may be mentioned.

Among those mentioned above, the anionic group-containing high molecular weight dispersant preferably has a polyester skeleton.

Accordingly, the affinity with the sulfo group-containing polyester resin is improved, and the dispersion stability of the solid content in the ink jet composition, the storage stability of the ink jet composition, and the ejection stability thereof by an ink jet method can be made more excellent.

When the anionic group-containing high molecular weight dispersant has a polyester skeleton, as a constituent monomer of the anionic group-containing high molecular weight dispersant, the monomers described in the above "1-3-1" to "1-3-3" may be used.

Although a molecular weight of the anionic group-containing high molecular weight dispersant is not particularly limited, the anionic group-containing high molecular weight dispersant preferably has a number average molecular weight smaller than that of the sulfo group-containing polyester resin.

Accordingly, the solubility in water is not only increased, but an increase in viscosity caused by bridging adsorption of the high molecular weight dispersant is also suppressed, so that the ink jet ejection stability can be further improved.

A lower limit of the number average molecular weight of the anionic group-containing high molecular weight dispersant is preferably 500, more preferably 1,000, and further preferably 1,500. In addition, an upper limit of the number average molecular weight of the anionic group-containing high molecular weight dispersant is preferably 5,000, more preferably 4,000, and further preferably 3,000.

Accordingly, the effects described above can be more significantly obtained.

A lower limit of a difference between the number average molecular weight of the sulfo group-containing polyester resin and the number average molecular weight of the anionic group-containing high molecular weight dispersant is preferably 3,000, more preferably 4,000, and further preferably 5,000. In addition, an upper limit of the difference between the number average molecular weight of the sulfo group-containing polyester resin and the number average molecular weight of the anionic group-containing high molecular weight dispersant is preferably 15,000, more preferably 11,000, and further preferably 9,000.

Accordingly, the effects described above can be more significantly obtained.

As the anionic group of the anionic group-containing high molecular weight dispersant, for example, although a sulfo group, a carboxy group, a sulfate ester salt, or a phosphate ester salt may be mentioned, a sulfo group or a carboxy group is preferable.

Accordingly, the effects described above can be more significantly obtained.

Although the rate of the number of moles of the anionic groups contained in the high molecular weight dispersant to the number of moles of all the constituent monomers of the high molecular weight dispersant, that is, the X2, may be larger than the X1, that is, the rate of the number of moles of the sulfo groups contained in the sulfo group-containing polyester resin to the number of moles of all the constituent monomers of the sulfo group-containing polyester resin, the X2 preferably satisfies the following conditions. That is, a lower limit of the X2 is preferably 3.0 percent on molar basis, more preferably 3.5 percent on molar basis, and further preferably 4.0 percent on molar basis. In addition, an upper limit of the X2 is preferably 24.0 percent on molar basis, more preferably 20.0 percent on molar basis, and further preferably 16.0 percent on molar basis.

Accordingly, while the dispersion stability of the particles in the ink jet composition, the storage stability of the ink jet composition, and the ejection stability of the ink jet composition by an ink jet method can be made more excellent, the color development property of the recorded portion to be formed using the ink jet composition can be made more excellent. In addition, the water resistance of the recorded portion to be formed using the ink jet composition can also be made more excellent.

In particular, when the anionic group-containing high molecular weight dispersant is a polyester-based high molecular weight dispersant having sulfo groups as the anionic groups, a lower limit of the X2 is preferably 4.0 percent on molar basis, more preferably 4.3 percent on molar basis, and further preferably 4.5 percent on molar basis. In addition, an upper limit of the X2 is preferably 7.5 percent on molar basis, more preferably 6.5 percent on molar basis, and further preferably 6.0 percent on molar basis.

Accordingly, the effects described above can be more significantly obtained.

A lower limit of a content of the anionic group-containing high molecular weight dispersant in the ink jet composition is preferably 0.1 percent by mass, more preferably 0.2 percent by mass, and further preferably 0.3 percent by mass. In addition, an upper limit of the content of the anionic group-containing high molecular weight dispersant in the ink jet composition is preferably 10.0 percent by mass, more preferably 7.0 percent by mass, and further preferably 5.0 percent by mass.

A lower limit of a content of the anionic group-containing high molecular weight dispersant with respect to 100 parts by mass of the sulfo group-containing polyester resin is preferably 5 parts by mass, more preferably 7 parts by mass, and further preferably 10 parts by mass. In addition, an upper limit of the content of the anionic group-containing high molecular weight dispersant with respect to 100 parts by mass of the sulfo group-containing polyester resin is preferably 25 parts by mass, more preferably 22 parts by mass, and further preferably 20 parts by mass.

Accordingly, while the color development property, the fixing property, the adhesion strength, and the like of the recorded portion to be formed using the ink jet composition are made sufficiently excellent, the dispersion stability of the solid content in the ink jet composition, the storage stability of the ink jet composition, and the ejection stability thereof by an ink jet method can be made further excellent.

1-5. Water-Soluble Organic Solvent

The ink jet composition may also include a water-soluble organic solvent.

Accordingly, for example, the viscosity of the ink jet composition can be appropriately adjusted, and/or a moisture retaining property of the ink jet composition can be enhanced. As a result, liquid-droplet ejection by an ink jet method can be stably performed.

As the water-soluble organic solvent included in the ink jet composition, for example, glycerin, propylene glycol, or 2-pyrrolidone may be mentioned.

When at least one of those solvents is included, an evaporation rate is decreased by an excellent moisture retaining ability, and a more stable liquid-droplet ejection can be performed.

Although a lower limit of a content of the water-soluble organic solvent included in the ink jet composition is not particularly limited, the lower limit described above is preferably 0 percent by mass, more preferably 1.0 percent by mass, and further preferably 3.0 percent by mass. In addition, although an upper limit of the content of the water-soluble organic solvent included in the ink jet composition is not particularly limited, the upper limit described above is preferably 30.0 percent by mass, more preferably 25.0 percent by mass, and further preferably 20.0 percent by mass.

Accordingly, the effects obtained when the water-soluble organic solvent described above is included can be more significantly obtained.

1-6. Other Components

The ink jet composition may include components other than those described above. Hereinafter, in this section, the components as described above are also called "other components" in some cases.

As other components, for example, there may be mentioned resin materials other than the sulfo group-containing polyester resin, various types of surfactants, a low molecular weight dispersant having no polymer structures, a dispersant, such as a high molecular weight dispersant having no anionic groups, other than the anionic group-containing high molecular weight dispersant, an emulsifier, a penetrant, such as triethylene glycol monomethyl ether, triethylene glycol monobutyl ether, diethylene glycol monomethyl ether, 1,2-hexanediol, 1,2-pentanediol, 1,2-butanediol, or 3-methyl-1,5-pentanediol, a drying suppressor such as triethanolamine, a pH adjuster, a chelating agent such as ethylenediaminetetraacetic acid salt, an antiseptic agent/fungicide, and/or an antirust agent. As the antiseptic agent/fungicide, for example, a compound having an isothiazoline ring structure in its molecule may be preferably used.

In addition, when the ink jet composition includes a surfactant, wettability of the ink jet composition to a recording medium can be made more preferable, and a more preferable image quality can be advantageously obtained.

As the surfactant included in the ink jet composition, for example, various types of surfactants, such as an anionic surfactant, a cationic surfactant, and a nonionic surfactant, may be used.

In more particular, as the surfactant included in the ink jet composition, for example, an acetylene-based surfactant, a silicone-based surfactant, or a fluorine-based surfactant may be mentioned.

A content of one of the other components in the ink jet composition is preferably 6.0 percent by mass or less and more preferably 5.0 percent by mass or less. In addition, when at least two types of components are included as the other components, the total content thereof preferably satisfies the above condition.

1-7. Other Conditions

Although a lower limit of a viscosity of the ink jet composition at 25° C. is not particularly limited, the lower limit described above is preferably 2.0 mPa·s, more preferably 3.0 mPa·s, and further preferably 4.0 mPa·s. In addition, although an upper limit of the viscosity of the ink jet composition at 25° C. is not particularly limited, the upper limit described above is preferably 9.0 mPa·s, more preferably 8.0 mPa·s, and further preferably 7.0 mPa·s.

Accordingly, the ejection stability of the ink jet composition can be further improved.

In addition, the viscosity may be measured at 25° C. using a viscoelastic tester, such as MCR-300 manufactured by Pysica, in a manner such that a shear rate is increased from 10 $[s^{-1}]$ to 1,000 $[s^{-1}]$, and a viscosity at a shear rate of 200 $[s^{-1}]$ is read.

Although a lower limit of a surface tension of the ink jet composition at 25° C. is not particularly limited, the lower limit described above is preferably 20 mN/m, more preferably 21 mN/m, and further preferably 23 mN/m. In addition, although an upper limit of the surface tension of the ink jet composition at 25° C. is not particularly limited, the upper limit described above is preferably 50 mN/m, more preferably 40 mN/m, and further preferably 30 mN/m.

Accordingly, for example, nozzle clogging of a recording apparatus by an ink jet method is not likely to be generated, and the ejection stability of the ink jet composition is further improved. In addition, even if the nozzle clogging is generated, the recovery thereof can be made more excellent when the nozzle is capped, that is, when capping is performed on the nozzle.

In addition, as the surface tension, a value measured by Wilhelmy method may be used. Measurement of the surface tension may be performed using a surface tensiometer, such as CBVP-7 (manufactured by Kyowa Interface Science Co., Ltd.).

When the ink jet composition of the present disclosure is an ink, the ink is generally received in a container, such as a cartridge, a bag, or a tank, and is then applied to a recording apparatus by an ink jet method. In other words, a recording apparatus according to the present disclosure includes a container, such as an ink cartridge, to receive the ink jet composition of the present disclosure to be used as the ink.

Although a lower limit of an average particle diameter of the particles is not particularly limited, the lower limit described above is preferably 5 nm, more preferably 20 nm, and further preferably 30 nm. In addition, although an upper limit of the average particle diameter of the particles is not particularly limited, the upper limit described above is preferably 300 nm, more preferably 280 nm, and further preferably 260 nm.

Accordingly, the preparation of the ink jet composition can be easily performed, and in addition, the dispersion stability of the particles in the ink jet composition, the storage stability of the ink jet composition, and the ejection stability of the ink jet composition by an ink jet method can be made more excellent. In addition, the color development property of the colorant can also be made more excellent.

In addition, in this specification, unless otherwise particularly noted, the average particle diameter indicates a volume base average particle diameter. The average particle diameter may be measured, for example, using Microtrac UPA (manufactured by Nikkiso Co., Ltd.).

In addition, a lower limit of a content of the particles in the ink jet composition is preferably 3.2 percent by mass, more preferably 4.4 percent by mass, and further preferably 5.1 percent by mass. In addition, an upper limit of the content of the particles in the ink jet composition is preferably 55.0 percent by mass, more preferably 44.0 percent by mass, and further preferably 38.0 percent by mass.

Accordingly, while the color development property, the fixing property, the adhesion strength, and the like of the recorded portion to be formed using the ink jet composition are made sufficiently excellent, the dispersion stability of the solid content in the ink jet composition, the storage stability of the ink jet composition, and the ejection stability thereof by an ink jet method can be made more excellent.

2. Method for Manufacturing Ink Jet Composition

Next, a method for manufacturing an ink jet composition will be described.

The ink jet composition of the present disclosure can be preferably manufactured, for example, by a method including an emulsified suspension preparation step of preparing an emulsified suspension by mixing a first composition which contains a sulfo group-containing polyester resin, a colorant, an anionic group-containing high molecular weight dispersant, and an organic solvent and a second composition which contains water, and an organic solvent removing step of removing at least part of the organic solvent from the emulsified suspension.

In the method as described above, first of all, the first composition which contains a sulfo group-containing polyester resin, a colorant, an anionic group-containing high molecular weight dispersant, and an organic solvent is prepared.

The first composition may be prepared by simultaneously mixing the components or may be prepared by mixing the components in a stepwise manner.

As the organic solvent, for example, an organic solvent having a solubility in water at 25° C. of 0.1 g to 30 g/100 g of $H_2O$ may be preferably used.

As the organic solvent described above, for example, a ketone, such as methyl ethyl ketone or methyl isopropyl ketone, or an ester, such as ethyl acetate or isopropyl acetate, may be mentioned, and one selected from those mentioned may be used alone, or at least two types thereof may be used in combination.

In addition, the organic solvent is preferably an organic solvent which dissolves or disperses the sulfo group-containing polyester resin and is also preferably an organic solvent which is likely to be removed in a later step. Hence, an organic solvent having a relatively low boiling point is preferable.

From the points as described above, as the organic solvent, methyl ethyl ketone or ethyl acetate is preferable, and methyl ethyl ketone is more preferable.

In addition, for the preparation of the first composition, components other than the sulfo group-containing polyester resin, the colorant, the anionic group-containing high molecular weight dispersant, and the organic solvent may also be used.

As the components described above, for example, a basic compound and/or an emulsifier may be mentioned.

2-1. Emulsified Suspension Preparation Step

In the emulsified suspension preparation step, the first composition and the second composition which contains water are mixed together to prepare an emulsified suspension.

The emulsified suspension thus obtained is placed in the state in which a dispersoid including the sulfo group-containing polyester resin, the colorant, the anionic group-containing high molecular weight dispersant, and the organic solvent is dispersed in a water-based dispersion medium.

The second composition may at least contain water, and for example, pure water may be used, or a liquid containing another component besides water may also be used. As the component described above, for example, an organic solvent having a high solubility in water as compared to that of the organic solvent used for the preparation of the first composition or a basic component may be mentioned.

As the organic solvent having a high solubility in water as compared to that of the organic solvent used for the preparation of the first composition, for example, an organic solvent, such as 2-propanol, which is mixed with water at an arbitrary ratio may be mentioned.

The basic component may be mixed with the first composition, for example, prior to the mixing between the first composition and the second composition.

As the basic compound, for example, there may be mentioned an inorganic base, such as sodium hydroxide, potassium hydroxide, or ammonia; or an organic base, such as diethylamine, triethylamine, or isopropylamine, and one selected from those mentioned above may be used alone, or at least two types thereof may be used in combination.

Although the mixing between the first composition and the second composition may be performed, for example, by supplying the second composition to the first composition or by supplying the first composition to the second composition, the mixing described above is preferably performed by dripping the second composition to the first composition.

Accordingly, the first composition can be more preferably phase-transfer emulsified, and the particles having the average particle diameter as described above can be more preferably formed.

In addition, the mixing between the first composition and the second composition is preferably performed by supplying the second composition to the first composition while the first composition is stirred.

Accordingly, the first composition can be further preferably phase-transfer emulsified, and the particles having the average particle diameter as described above can be further preferably formed.

2-2. Organic Solvent Removing Step

In the organic solvent removing step, at least part of the organic solvent is removed from the emulsified suspension.

Accordingly, solid particles which contain the colorant and the sulfo group-containing polyester resin and which correspond to the particles forming the ink jet composition of the present disclosure are formed.

The organic solvent removing step may be performed, for example, by heating the emulsified suspension or by placing the emulsified suspension in a reduced-pressure environment.

A dispersion liquid obtained in the organic solvent removing step in which the solid particles containing the colorant and the sulfo group-containing polyester resin are dispersed in a water-based dispersion medium may be directly used as the ink jet composition of the present disclosure, or the dispersion liquid described above may be used as the ink jet composition of the present disclosure after being mixed with at least one of other components.

In addition, after the organic solvent removing step is performed, a post-treatment step, such as washing and/or drying, may also be performed.

Accordingly, unnecessary components can be removed, and an ink jet composition in which the composition is more reliably prepared can be obtained.

The washing of the particles contained in the dispersion liquid obtained in the organic solvent removing step can be performed in a manner such that after a fine particle cake forming the dispersion liquid is obtained by separation therefrom using a separation device, such as a centrifugal machine, a filter press, or a belt filter, the fine particle cake thus obtained is stirred and dispersed in water and is then further dehydrated.

After the dehydration, if needed, a drying treatment may also be performed.

For the drying treatment, for example, a mixing vacuum dryer, such as a ribocorn type dryer (manufactured by Okawara MFG. Co., Ltd.) or a nauta mixer (manufactured by Hosokawa Micron Corporation); or a fluidized bed dryer, such as a fluidized bed dryer (manufactured by Okawara MFG. Co., Ltd.) or a vibration fluidized bed dryer (manufactured by Chuo Kakohki Co., Ltd.) may be used.

In the case in which the dehydration treatment and the drying treatment are performed, when the washed particles are mixed with other components including at least water, the ink jet composition of the present disclosure described above can be obtained.

In addition, in the organic solvent removing step, at least part of the organic solvent contained in the emulsified suspension, in particular, at least part of the organic solvent contained in the dispersoid of the emulsified suspension, may be removed, and the organic solvent described above is not required to be fully removed. Even in the case as described above, by the post-treatment step, such as washing and/or drying, in general, a remaining organic solvent can be sufficiently removed. In addition, in an ink jet composition to be finally obtained, the organic solvent may remain as long as the amount thereof is small.

3. Ink Jet Recording Method

Next, an ink jet recording method of the present disclosure will be described.

The ink jet recording method of the present disclosure includes an ejection step of ejecting the ink jet composition according to the present disclosure by an ink jet method.

By the method described above, the liquid-droplet ejection by an ink jet method can be stably performed, and hence, an ink jet recording method which is preferably applied to manufacturing of a recorded matter having a recorded portion excellent in color development property can be provided. In particular, an excellent color development property can be obtained on various types of recording media. In addition, the fixing property and the adhesion strength of the recorded portion to be formed using the ink jet composition can be made excellent.

The ink jet recording method of the present disclosure preferably further includes, after the ejection step, a heating step of heating a recording medium to which the ink jet composition is adhered.

Accordingly, the color development property of the recorded portion and the fixing property thereof to the recording medium are further improved.

3-1. Ejection Step

In the ejection step, by an ink jet method, the ink jet composition is ejected and is applied to the recording medium. The ejection of the ink jet composition by an ink jet method can be performed by a known ink jet recording apparatus. As an ejection method, for example, a piezoelectric method or a method in which an ink is ejected by a bubble thereof generated by heating may be used. In particular, for example, since the ink jet composition is not likely to be deteriorated, a piezoelectric method is preferable.

In the ejection step, at least two types of the ink jet composition according to the present disclosure may be used. In more particular, for example, at least two types of ink jet compositions which include colorants having different compositions and/or contents may be used in combination.

In addition, in the ejection step, an ink other than the ink jet composition according to the present disclosure may also be used in combination.

3-2. Recording Medium

Although a constituent material of the recording medium is not particularly limited, for example, there may be mentioned a resin material, such as a polyurethane, a polyethylene, a polypropylene, a polyester, a polyamide, or an acrylic resin; paper, such as cardboard, regular paper, or ink jet exclusive paper; glass, metal, ceramic, leather, wood, china, concrete, or fibers formed from at least one of those mentioned above; and various types of natural fibers, synthetic fibers, and semi-synthetic fibers formed from silk, wool, cotton, hemp, a polyester, a polyamide (nylon), an acrylic resin, a polyurethane, a cellulose, a linter, a rayon, a cupra, and an acetate. One selected from those mentioned above may be used alone, or at least two types thereof may be used in combination. In addition, as the recording medium, a medium having a three-dimensional structure, such as a sheet shape, a spherical shape, or a rectangular parallelepiped shape, may also be used.

When the recording medium is formed from a material containing a polyester, adhesion between the recording medium and the recorded portion formed using the ink jet composition of the present disclosure can be made more excellent.

In particular, the recording medium is preferably a cloth. Although dyeing of clothes has a large demand for printed T-shirts and the like, and in addition, thermal transfer printing by ironing or the like has been spreading, a recorded matter in which a recorded portion is provided on the cloth as described above has been required to have a comfortable texture, in particular, such as smoothness, flexibility, and softness, and the recorded portion is also required to have durability and the like. According to the present disclosure, the requirements as described above can be satisfied. Hence, when the recording medium is a cloth, the effects according to the present disclosure can be more significantly obtained.

As the cloth, for example, various types of weaves, such as a plain weave, a twill weave, a stain weave, a change plain weave, a change twill weave, a change stain weave, a change weave, a pattern weave, a single weave, a double weave, a multi weave, a warp pile weave, a weft pile weave, and a leno weave may be mentioned.

In addition, the thickness of the fibers forming the cloth may be set, for example, to 10 to 100 deniers (d).

As the fibers forming the cloth, for example, there may be mentioned polyester fibers, nylon fibers, triacetate fibers, diacetate fibers, polyamide fibers, cellulose fibers, or blended fibers using at least two types of fibers mentioned above. In addition, for example, blended fibers between at least one type of those fibers mentioned above and regenerated fibers, such as rayon fibers, or natural fibers, such as cotton, silk, or wool, may also be used.

In addition, as the recording medium, a film to be used while being bent and/or stretched is also preferably used.

Accordingly, for example, effects of the present disclosure such that a recorded portion having not only a low tacking property and an excellent texture but also excellent elasticity and adhesion to the recording medium can be formed are more significantly obtained.

3-3. Heating Step

In this embodiment, after the ejection step described above is performed, the recording medium to which the ink jet composition is applied is heated.

Although a lower limit of a heating temperature of the recording medium in this step is not particularly limited, the lower limit described above is preferably 100° C., more preferably 105° C., and further preferably 110° C. In addition, although an upper limit of the heating temperature of the recording medium in this step is not particularly limited, the upper limit described above is preferably 160° C., more preferably 155° C., and further preferably 150° C.

Accordingly, the effects obtained by providing the heating step as described above can be more significantly achieved. In addition, energy required to manufacture the recorded matter can be reduced, and the productivity of the recorded matter can be further improved. In addition, the heating step may also be applied to a recording medium having a relatively low heat resistance, and the range of selection of the recording medium can be further widened. In addition, an unfavorable change in color, the change in optical density, and the like can be preferably prevented which are caused by heating, such as washing/cleaning using hot water, heating/drying by a dryer, or a heat treatment by ironing or the like, to be performed after the recorded matter is manufactured. In addition, when the heating temperature in this step is in the range described above, the texture of the recorded portion can be effectively prevented from being degraded.

Although depending on the heating temperature of the recording medium in this step, a lower limit of a heating time of the recording medium in this step is preferably 0.2 seconds, more preferably 1 second, and further preferably 5 seconds. In addition, an upper limit of the heating time of the recording medium in this step is preferably 300 seconds, more preferably 60 seconds, and further preferably 30 seconds.

Accordingly, the effects obtained by providing the heating step as described above can be more significantly achieved. In addition, energy required to manufacture the recorded matter can be reduced, and the productivity of the recorded matter can be further improved. In addition, the heating step may also be applied to a recording medium having a relatively low heat resistance, and the range of selection of the recording medium can be further widened. In addition, an unfavorable change in color, the change in optical density, and the like can be preferably prevented which are caused by heating, such as washing/cleaning using hot water, heating/drying by a dryer, or a heat treatment by ironing or the like, to be performed after the recorded matter is manufactured. In addition, when the heating time in this step is in the range described above, the texture of the recorded portion can be effectively prevented from being degraded.

In addition, this step may be performed such that the heating is performed in the state in which a surface of the recording medium to which the ink jet composition is adhered is apart from a heating member or may be performed such that the heating is performed in the state in which the recording medium to which the ink jet composition is adhered is in close contact with the heating member.

The heating step may be simultaneously performed with the ejection step. In more particular, for example, the recording medium to which the ink jet composition is to be applied is heated in advance, and after the ink jet composition is brought into contact with the recording medium, a heat treatment may also be performed. In this case, for example, before and after the ink jet composition is applied to the recording medium, the heating may be continuously performed, or after the heating of the recording medium to which the ink jet composition is to be applied is interrupted, the heating may be again started.

4. Recording Apparatus

Next, a recording apparatus will be described.

FIGURE is a schematic perspective view of a recording apparatus of a preferable embodiment.

In the following description, as the recording apparatus, an on-carriage type printer in which an ink cartridge is mounted on a carriage will be described by way of example. In this embodiment, the recording apparatus is not limited to an on-carriage type printer and may also be, for example, an off-carriage type printer in which an ink cartridge is fixed outside.

In addition, the printer functioning as a recording apparatus described below is a serial printer in which an ink jet head for recording is mounted on a carriage configured to be transferred in a predetermined direction, and in association with the transfer of the carriage, the ink jet head is transferred so as to eject liquid droplets on a recording medium. The recording apparatus in the present disclosure is not limited to a serial printer and may also be, for example, a line printer. The line printer is a printer in which an ink jet head is formed wider than a width of a recording medium, and liquid droplets are ejected on the recording medium while the ink jet head is not transferred.

In the drawing used for illustration, in order to recognize individual members, the scales thereof are appropriately changed.

A recording apparatus 1 includes an ink jet head 2 to eject the ink jet composition of the present disclosure described above to a recording medium M by an ink jet method and performs the ink jet recording method of the present disclosure described above.

Accordingly, a recording apparatus capable of preferably manufacturing a highly durable recorded matter which has a recorded portion excellent in texture can be provided.

In particular, the recording apparatus 1 shown in FIGURE includes the ink jet head 2, an ink cartridge 3, a carriage 4, a platen 5, a heating mechanism 6, a carriage transfer mechanism 7, a medium transport mechanism 8, a guide rod 9, a linear encoder 10, and a control portion CONT.

The control portion CONT controls operations of the entire recording apparatus 1.

The carriage 4 mounts the ink jet head 2 which will be described later and detachably mounts the ink cartridge 3 to supply the ink jet composition to the ink jet head 2.

The platen 5 is disposed at a lower side of the ink jet head 2, and the recording medium M is transported thereby.

The heating mechanism 6 heats the recording medium M. As described above, since the heating mechanism 6 to heat the recording medium M is provided, a recorded portion formed by the ink jet composition can be preferably fixed to the recording medium M. In particular, without using an apparatus other than the recording apparatus 1, the recorded portion can be preferably fixed.

The carriage transfer mechanism 7 transfers the carriage 4 in a medium width direction of the recording medium M.

The medium transport mechanism 8 transports the recording medium M in a medium transport direction. In this case, the medium width direction is a main scanning direction which is a scanning direction of the ink jet head 2. The medium transport direction is a direction orthogonal to the main scanning direction and is a sub-scanning direction in which the recording medium M is transported.

The ink jet head 2 is a device to adhere the ink jet composition to the recording medium M and includes, at a surface facing the recording medium M to which the ink is to be adhered, a plurality of nozzles (not shown) to eject the ink jet composition. Those nozzles are disposed in lines so as to form a nozzle surface at a nozzle plate surface.

As a method to eject the ink jet composition from a nozzle, for example, there may be mentioned a piezoelectric method in which a pressure and a recording information signal are simultaneously applied to the ink jet composition by a piezoelectric element, and liquid droplets of the ink jet composition are ejected and recorded.

In FIGURE, the ink cartridge 3 to supply the ink jet composition to the ink jet head 2 is formed of four independent cartridges. In the four cartridges, for example, different types of ink jet compositions are filled. The ink cartridge 3 is detachably mounted to the ink jet head 2. Although the number of the cartridges is four in the example shown in FIGURE, the number of the cartridges is not limited thereto, and a desired number of cartridges may be mounted.

The carriage 4 is fitted so as to be held by the guide rod 9 which is a support member provided in the main scanning direction and is transferred in the main scanning direction along the guide rod 9 by the carriage transfer mechanism 7. In the example shown in FIGURE, although the carriage 4 is transferred in the main scanning direction, the transfer thereof is not limited thereto, and the carriage 4 may also be transferred, besides in the main scanning direction, in the sub-scanning direction.

The heating mechanism 6 may be provided at any position as long as the recording medium M can be heated. In the example shown in FIGURE, the heating mechanism 6 is provided above the platen 5 and at a position facing the ink jet head 2. When the heating mechanism 6 is provided at a position facing the ink jet head 2, a position of the recording medium M to which the ink jet composition is adhered can be reliably heated, and the ink jet composition adhered to the recording medium M can be efficiently dried.

As the heating mechanism 6, for example, there may be mentioned a print heater mechanism to heat the recording medium M by a heat source to be brought into contact therewith, a mechanism to radiate infrared rays or microwaves which are electromagnetic waves having a maximum wavelength of approximately 2, 450 MHZ, or a dryer mechanism to blow a hot wind.

Various conditions, such as a heating timing, a heating temperature, and a heating time, of the heating of the recording medium M by the heating mechanism 6 are controlled by the control portion CONT.

Besides the heating mechanism 6, the recording apparatus 1 may have a second heating mechanism (not shown). In this case, the second heating mechanism is provided downstream of the heating mechanism 6 in the transport direction of the recording medium M. Accordingly, the drying property of the ink jet composition adhered to the recording medium M is improved. As the second heating mechanism, one of the mechanisms described in the heating mechanism 6 may be used.

The linear encoder 10 detects a signal of a position of the carriage 4 on the main scanning direction. The signal detected by the linear encoder 10 is transmitted as the position information to the control portion CONT. The control portion CONT recognizes a scanning position of the ink jet head 2 based on the position information transmitted from the linear encoder 10 and controls a recording operation, that is, an ejection operation and the like, by the ink jet head 2. In addition, the control portion CONT is configured to be able to perform a variable control of a transfer rate of the carriage 4.

5. Recorded Matter

Next, a recorded matter according to the present disclosure will be described.

The recorded matter according to the present disclosure has a recorded portion formed using the ink jet composition according to the present disclosure described above.

Accordingly, a recorded matter having a recorded portion excellent in color development property can be provided. In addition, the fixing property and the adhesion strength of the recorded portion to the recording medium can be made excellent.

As the recording medium, one of the media described above may be preferably used.

Heretofore, although preferable embodiments of the present disclosure have been described, the present disclosure is not limited thereto.

For example, the ink jet composition of the present disclosure may be used as a composition to be ejected by an ink jet method and may be not a composition to be applied to the method as described above.

In addition, for example, the ink jet composition of the present disclosure may also be a composition to be applied to a method further including other steps besides the steps as described above.

In the case described above, as a pre-treatment step, for example, a step of applying a coating layer to the recording medium may be mentioned.

In addition, as an intermediate treatment step, for example, a step of pre-heating the recording medium may be mentioned.

In addition, as a post-treatment step, for example, a step of washing the recording medium may be mentioned.

In addition, the ink jet composition of the present disclosure may be manufactured by any method and is not limited to that manufactured by the method described above. For example, the ink jet composition of the present disclosure may be an ink jet composition containing particles formed by an emulsion polymerization method.

EXAMPLES

Next, concrete Examples of the present disclosure will be described.

6. Synthesis of Polyester Resin

Synthetic Example A1

After 100.0 parts by mass of dimethyl terephthalate, 100.0 parts by mass of dimethyl isophthalate, 8.0 parts by mass of monosodium dimethyl 5-sulfoisophthalate, 90.0 parts by mass of ethylene glycol, 45.0 parts by mass of 1,3-propanediol, and 0.5 parts by mass of tetrabutyl titanate were charged in an autoclave equipped with a thermometer and a stirrer, heating was performed at 150° C. to 200° C. for 180 minutes, so that an ester exchange reaction was performed.

Next, at a temperature of 200° C., while the diol component was distilled off, the pressure in the system was gradually reduced to 10 mmHg after 30 minutes, and subsequently, while the temperature was gradually increased from 200° C. to 240° C., vacuum heating was continued for 120 minutes, so that a sulfo group-containing polyester resin was obtained.

In the sulfo group-containing polyester resin thus obtained, the number average molecular weight was 7,500, a composition ratio in terms of the molar ratio was terephthalic acid unit/isophthalic acid unit/5-sulfo isophthalic acid sodium salt unit/ethylene glycol unit/1,3-propanediol unit=24.0:25.0:1.0:26.0:24.0, the glass transition temperature was 65° C., and the rate X1 of the sulfo groups to all the monomer units was 1.0 percent on molar basis.

Synthetic Examples A2 to A9

Except for that the types of the monomer components used as the raw materials, the ratios thereof, and the polymerization conditions were adjusted, sulfo group-containing polyester resins were obtained in a manner similar to that of the above Synthetic Example A1.

Synthetic Example A10

Except for that the types of the monomer components used as the raw materials, the ratios thereof, and the polymerization conditions were adjusted, a polyester resin was obtained in a manner similar to that of the above Synthetic Example A1. The polyester resin thus obtained had no sulfo groups in its molecule.

The conditions of the polyester resins obtained in the above Synthetic Examples A1 to A10 are collectively shown in Table 1. In addition, in the table, dimethyl terephthalate is represented by "TPA", dimethyl isophthalate is represented by "IPA", monosodium dimethyl 5-sulfo isophthalate is represented by "5S-IPA", ethylene glycol is represented by "EG", neopentyl glycol is represented by "NPG", 1,3-propanediol is represented by "1,3-PD", 1,4-cyclohexanediol is represented by "1,4-CHD", and 3-methyl-1,5-pentanediol is represented by "MPD". The sulfo group-containing polyester resins included in the ink jet compositions of the above Synthetic Examples A1 to A9 all had an acid value in a range of 1.0 to 15 KOHmg/g.

TABLE 1

| | COMPOSITION RATIO OF CONSTITUENT MONOMER [MOLAR RATIO] | | | | | | | | RATE X1 OF SULFO GROUPS TO ALL CONSTITUENT MONOMERS [PERCENT ON MOLAR BASIS] | NUMBER AVERAGE MOLECULAR WEIGHT |
|---|---|---|---|---|---|---|---|---|---|---|
| | TPA | IPA | 5S-IPA | EG | NPG | 1,3-PD | 1,4-CHD | MPD | | |
| SYNTHETIC EXAMPLE A1 | 24.0 | 25.0 | 1.0 | 26.0 | — | 24.0 | — | — | 1.0 | 7,500 |
| SYNTHETIC EXAMPLE A2 | 24.6 | 24.6 | 0.8 | 27.0 | 23.0 | — | — | — | 0.8 | 9,000 |
| SYNTHETIC EXAMPLE A3 | 24.0 | 24.5 | 1.5 | 32.0 | — | — | — | 18.0 | 1.5 | 19,000 |
| SYNTHETIC EXAMPLE A4 | 24.5 | 24.5 | 1.0 | 25.0 | 10.0 | 15.0 | — | — | 1.0 | 11,000 |
| SYNTHETIC EXAMPLE A5 | 23.8 | 23.8 | 2.4 | 25.0 | — | — | 25.0 | — | 2.4 | 5,500 |
| SYNTHETIC EXAMPLE A6 | 24.0 | 25.0 | 1.0 | 26.0 | — | 24.0 | — | — | 1.0 | 3,000 |
| SYNTHETIC EXAMPLE A7 | 24.0 | 25.0 | 1.0 | 26.0 | — | 24.0 | — | — | 1.0 | 25,000 |
| SYNTHETIC EXAMPLE A8 | 25.0 | 24.7 | 0.3 | 26.0 | — | 24.0 | — | — | 0.3 | 10,000 |
| SYNTHETIC EXAMPLE A9 | 24.0 | 22.5 | 3.5 | 26.0 | — | 24.0 | — | — | 3.5 | 8,500 |
| SYNTHETIC EXAMPLE A10 | 25.0 | 25.0 | — | 25.0 | — | 25.0 | — | — | 0.0 | 6,500 |

7. Synthesis of High Molecular Weight Dispersant

Synthetic Example B1

After 100.0 parts by mass of dimethyl terephthalate, 100.0 parts by mass of dimethyl isophthalate, 40.0 parts by mass of monosodium dimethyl 5-sulfoisophthalate, 90.0 parts by mass of ethylene glycol, 50.0 parts by mass of 1,3-propanediol, and 0.5 parts by mass of tetrabutyl titanate were charged in an autoclave equipped with a thermometer and a stirrer, heating was performed at 150° C. to 200° C. for 180 minutes, so that an ester exchange reaction was performed.

Next, at a temperature of 180° C., while the diol component was distilled off, the pressure in the system was gradually reduced to 10 mmHg after 30 minutes, and subsequently, while the temperature was gradually increased from 180° C. to 200° C., vacuum heating was continued for 120 minutes, so that an anionic group-containing high molecular weight dispersant was obtained.

In the anionic group-containing high molecular weight dispersant thus obtained, the number average molecular weight was 1,500, a composition ratio in terms of the molar ratio was terephthalic acid unit/isophthalic acid unit/5-sulfo isophthalic acid sodium salt unit/ethylene glycol unit/1,3- propanediol unit=22.0:22.0:6.0:28.0:22.0, the glass transition temperature was 56° C., and the rate X2 of the anionic groups to all the monomer units was 6.0 percent on molar basis.

Synthetic Examples B2 to B6

Except for that the types of the monomer components used as the raw materials, the ratios thereof, and the polymerization conditions were adjusted, anionic group-containing high molecular weight dispersants were obtained in a manner similar to that of the above Synthetic Example B1.

Synthetic Examples B7

After 100.0 parts by mass of dimethyl terephthalate, 100.0 parts by mass of dimethyl isophthalate, 90.0 parts by mass of ethylene glycol, 45.0 parts by mass of 1,3-propanediol, and 0.5 parts by mass of tetrabutyl titanate were charged in an autoclave equipped with a thermometer and a stirrer, heating was performed at 150° C. to 200° C. for 180 minutes, so that an ester exchange reaction was performed.

Next, at a temperature of 200° C., while the diol component was distilled off, the pressure in the system was gradually reduced to 10 mmHg after 30 minutes, and subsequently, while the temperature was gradually increased from 200° C. to 210° C., vacuum heating was continued for 120 minutes, so that a hydroxy group-terminated polyester resin having a number average molecular weight of 2,800, a hydroxy value of 40.0, and an acid value of less than 2 was obtained. After the hydroxy group-terminated polyester resin thus obtained was melted in a nitrogen atmosphere, 7.0 parts by mass of trimellitic anhydride was added, and an addition reaction was performed at 200° C. for 30 minutes, so that a carboxylic acid group-containing polyester resin having a number average molecular weight of 2,800, an acid value of 80.0, and a hydroxy value of less than 2 was obtained. A composition ratio in terms of the molar ratio was terephthalic acid unit/isophthalic acid unit/trimellitic acid unit/ethylene glycol unit/1,3-propanediol unit=23.0:23.0:8.0:24.0:22.0, the glass transition temperature was 61° C., and the rate X2 of the anionic groups to all the monomer units was 16.0 percent on molar basis.

Synthetic Example B8

In a reaction chamber equipped with a reflux condenser tube and a thermometer, 73.0 parts by mass of styrene (manufactured by Tokyo Chemical Industry Co., Ltd.), 15.0 parts by mass of methyl methacrylate (manufactured by Tokyo Chemical Industry Co., Ltd.), 10.8 parts by mass of acrylic acid (manufactured by Tokyo Chemical Industry Co., Ltd.), and 10.0 parts by mass of 3-mercapto propionic acid were charge together with toluene (manufactured by Tokyo Chemical Industry Co., Ltd.) so as to form a mixture in an amount of 270 parts by mass and were then dissolved using a magnetic stirrer. After the inside of the reaction chamber was replaced with nitrogen, 30 parts by mass of a toluene solution containing azobisisobutyronitrile (manufactured by FUJIFILM Wako Pure Chemical Corporation) at a concentration of 1.0 part by mass was dripped at room temperature. Subsequently, a reaction was performed at 75° C. for 6 hours. After the reaction was completed, a reaction product was dripped in water, so that a white solid substance was precipitated. After the white solid substance thus obtained was processed by suction-filtration, washing was repeatedly performed with water, and vacuum drying at 50° C. for 10 hours was performed, so that a styrene-acrylic-based resin was obtained. In this styrene-acrylic-based resin, the number average molecular weight was 3,800, the acid value was 84.0, a composition ratio in terms of the molar ratio was styrene unit/methyl methacrylate unit/acrylic acid unit=70.0:15.0:15.0, and the rate X2 of the carboxylic acid groups to all the monomer units was 15.0 percent on molar basis.

The conditions of the high molecular weight dispersants obtained in the above Synthetic Examples B1 to B8 are collectively shown in Table 2. In addition, in the table, dimethyl terephthalate is represented by "TPA", dimethyl isophthalate is represented by "IPA", monosodium dimethyl 5-sulfo isophthalate is represented by "5S-IPA", ethylene glycol is represented by "EG", neopentyl glycol is represented by "NPG", 1,3-propanediol is represented by "1,3-PD", 1,4-cyclohexanediol is represented by "1,4-CHD", 3-methyl-1,5-pentanediol is represented by "MPD", trimellitic acid is represented by "TMA", styrene is represented by "ST", acrylic acid is represented by "AA", and methyl methacrylate is represented by "MMA".

TABLE 2

| | COMPOSITION RATIO OF CONSTITUENT MONOMER [MOLAR RATIO] | | | | | | | | | | | | RATE X2 OF ANIONIC GROUPS TO ALL CONSTITUENT MONOMERS [PERCENT ON MOLAR BASIS] | NUMBER AVERAGE MOLECULAR WEIGHT |
|---|---|---|---|---|---|---|---|---|---|---|---|---|---|---|
| | TPA | IPA | 5S-IPA | EG | NPG | 1,3-PD | 1,4-CHD | MPD | TMA | ST | AA | MMA | | |
| SYNTHETIC EXAMPLE B1 | 22.0 | 22.0 | 6.0 | 28.0 | — | 22.0 | — | — | — | — | — | — | 6.0 | 1,500 |
| SYNTHETIC EXAMPLE B2 | 21.5 | 21.0 | 7.5 | 28.0 | — | 22.0 | — | — | — | — | — | — | 7.5 | 2,500 |
| SYNTHETIC EXAMPLE B3 | 20.0 | 24.0 | 6.0 | 28.0 | — | 10.0 | 12.0 | — | — | — | — | — | 6.0 | 2,000 |
| SYNTHETIC EXAMPLE B4 | 23.5 | 22.0 | 4.5 | 27.0 | 23.0 | — | — | — | — | — | — | — | 4.5 | 2,400 |
| SYNTHETIC EXAMPLE B5 | 24.0 | 24.0 | 2.0 | 28.0 | — | 22.0 | — | — | — | — | — | — | 2.0 | 2,000 |
| SYNTHETIC EXAMPLE B6 | 22.0 | 20.0 | 8.0 | 26.0 | 24.0 | — | — | — | — | — | — | — | 8.0 | 3,000 |

TABLE 2-continued

| | COMPOSITION RATIO OF CONSTITUENT MONOMER [MOLAR RATIO] | | | | | | | | | | | | RATE X2 OF ANIONIC GROUPS TO ALL CONSTITUENT MONOMERS [PERCENT ON MOLAR BASIS] | NUMBER AVERAGE MOLECULAR WEIGHT |
|---|---|---|---|---|---|---|---|---|---|---|---|---|---|---|
| | TPA | IPA | 5S-IPA | EG | NPG | 1,3-PD | 1,4-CHD | MPD | TMA | ST | AA | MMA | | |
| SYNTHETIC EXAMPLE B7 | 23.0 | 23.0 | — | 24.0 | 22.0 | — | — | — | 8.0 | — | — | — | 16.0 | 2,800 |
| SYNTHETIC EXAMPLE B8 | — | — | — | — | — | — | — | — | — | 70.0 | 15.0 | 15.0 | 15.0 | 3,800 |

8. Preparation of Ink Jet Composition

Example 1

First, 15.0 parts by mass of C.I. Disperse Red 60 which was a dispersive dye functioning as a colorant, 85.0 parts by mass of the polyester resin synthesized in Synthetic Example A1, 15.0 parts by mass of the high molecular weight dispersant synthesized in Synthetic Example B1, and 385.0 parts by mass of methyl ethyl ketone were mixed together and then stirred and dissolved with heating at 65° C. to 75° C.

Subsequently, after 15 parts by mass of 2-propanol and 485 parts by mass of water were added to the mixture described above and then heated and stirred at 80° C. for 2 hours, methyl ethyl ketone, 2-propanol, and part of water were distilled off at a reduced pressure, so that a water dispersion was obtained. In this water dispersion, a total content of the high molecular weight dispersant and particles in which the dispersive dye was dissolved in and fixed to the polyester resin was 30 percent by mass.

After 6.0 parts by mass of propylene glycol, 0.2 parts by mass of triethanolamine, 1.0 part by mass of Olfine E1010 (manufactured by Nisshin Chemical Industry Co., Ltd.) functioning as a surfactant, and 2.8 parts by mass of pure water were added to 90.0 parts by mass of the water dispersion described above, stirring and mixing were performed, so that an ink jet composition was manufactured.

Examples 2 to 15

Except for that the types/use amounts of the polyester resins, the use amounts of the colorants, and the types/use amounts of the high molecular weight dispersants to be used for the preparation of the water dispersions were adjusted to have the compositions shown in Tables 3 and 4, ink jet compositions were prepared in a manner similar to that of the above Example 1.

Comparative Examples 1 to 4

Except for that the types/use amounts of the polyester resins, the use amounts of the colorants, and the types/use amounts of the high molecular weight dispersants to be used for the preparation of the water dispersions were adjusted to have the compositions shown in Table 4, ink jet compositions were prepared in a manner similar to that of the above Example 1.

In the manufacturing of the ink jet compositions of Examples and Comparative Examples, the types/use amounts of the polyester resins, the colorants, and the high molecular weight dispersants used for the preparation of the water dispersions are collectively shown in Tables 3 and 4. In addition, in the tables, the sulfo group-containing polyester resins synthesized in Synthetic Examples A1, A2, A3, A4, A5, A6, A7, A8, and A9 are represented by "A1", "A2", "A3", "A4", "A5", "A6", "A7", "A8", and "A9", respectively; the polyester resin synthesized in Synthetic Example A10 is represented by "A10"; the anionic group-containing high molecular weight dispersants synthesized in Synthetic Examples B1, B2, B3, B4, B5, B6, B7, and B8 are represented by "B1", "B2", "B3", "B4", "B5", "B6", "B7", and "B8", respectively; and C. I. Disperse Red 60 is represented by "DR60". The ink jet compositions of the above Examples all had a viscosity in a range of 2.0 to 9.0 mPa·s. In addition, the viscosity is measured using a viscoelastic tester MCR-300 (manufactured by Pysica) at 25° C. such that a shear rate is increased from 10 $[s^{-1}]$ to 1,000 $[s^{-1}]$, and a viscosity at a shear rate of 200 $[s^{-1}]$ is read. In addition, the ink jet compositions of the above Examples all had a surface tension in a range of 23 to 30 mN/m. In addition, the surface tension is measured using a surface tensiometer (CBVP-7, manufactured by Kyowa Interface Science Co., Ltd.) at 25° C. by Wilhelmy method. In addition, the average particle diameters of the particles containing the colorant and the sulfo group-containing polyester resin in the ink jet compositions of the above Examples were all in a range of 30 to 300 nm. In addition, in the ink jet compositions of the above Examples, the presence of the colorant and the sulfo group-containing polyester resin was not confirmed other than in the particles.

TABLE 3

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| USE AMOUNT FOR PREPARATION OF WATER DISPERSION [PARTS BY MASS] | POLYESTER RESIN | A1 | 85.0 | — | — | — | — | — | — | — | — | — |
| | | A2 | — | 90.0 | — | — | — | — | — | — | — | 85.0 |
| | | A3 | — | — | 94.0 | — | — | — | — | — | — | — |
| | | A4 | — | — | — | 85.0 | — | — | — | — | — | — |
| | | A5 | — | — | — | — | 82.0 | — | — | — | — | — |
| | | A6 | — | — | — | — | — | 85.0 | — | — | — | — |
| | | A7 | — | — | — | — | — | — | 85.0 | — | — | — |

TABLE 3-continued

|  |  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|
|  | A8 | — | — | — | — | — | — | — | 90.0 | — | — |
|  | A9 | — | — | — | — | — | — | — | — | 88.0 | — |
|  | A10 | — | — | — | — | — | — | — | — | — | — |
| COLORANT | DR60 | 15.0 | 10.0 | 6.0 | 15.0 | 18.0 | 15.0 | 15.0 | 10.0 | 12.0 | 15.0 |
| HIGH | B1 | 15.0 | — | — | 10.0 | — | 15.0 | 15.0 | — | — | — |
| MOLECULAR | B2 | — | 20.0 | — | 10.0 | — | — | — | — | — | — |
| WEIGHT | B3 | — | — | — | — | 20.0 | — | — | — | — | — |
| DISPERSANT | B4 | — | — | 10.0 | — | — | — | — | 10.0 | 10.0 | — |
|  | B5 | — | — | — | — | — | — | — | — | — | 20.0 |
|  | B6 | — | — | — | — | — | — | — | — | — | — |
|  | B7 | — | — | — | — | — | — | — | — | — | — |
|  | B8 | — | — | — | — | — | — | — | — | — | — |

TABLE 3

|  |  |  | EXAMPLE 11 | EXAMPLE 12 | EXAMPLE 13 | EXAMPLE 14 | EXAMPLE 15 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|---|---|---|
| USE AMOUNT FOR PREPARATION OF WATER DISPERSION [PARTS BY MASS] | POLYESTER RESIN | A1 | — | — | — | 85.0 | — | 100.0 | — | — | — |
|  |  | A2 | 85.0 | — | — | — | 85.0 | — | — | — | — |
|  |  | A3 | — | — | — | — | — | — | — | — | — |
|  |  | A4 | — | — | — | — | — | — | — | — | — |
|  |  | A5 | — | 90.0 | 90.0 | — | — | — | — | — | — |
|  |  | A6 | — | — | — | — | — | — | — | — | — |
|  |  | A7 | — | — | — | — | — | — | — | — | — |
|  |  | A8 | — | — | — | — | — | — | — | — | — |
|  |  | A9 | — | — | — | — | — | — | — | — | 85.0 |
|  |  | A10 | — | — | — | — | — | — | — | 85.0 | — |
|  | COLORANT | DR60 | 15.0 | 10.0 | 10.0 | 15.0 | 15.0 | 20.0 | 20.0 | 15.0 | 15.0 |
|  | HIGH MOLECULAR WEIGHT DISPERSANT | B1 | — | — | — | 4.0 | — | — | 100.0 | — | — |
|  |  | B2 | — | — | — | — | 30.0 | — | — | — | — |
|  |  | B3 | — | — | — | — | — | — | — | — | — |
|  |  | B4 | — | — | — | — | — | — | — | — | — |
|  |  | B5 | — | — | — | — | — | — | — | — | 10.0 |
|  |  | B6 | 12.0 | — | — | — | — | — | — | — | — |
|  |  | B7 | — | 25.0 | — | — | — | — | — | — | — |
|  |  | B8 | — | — | 25.0 | — | — | — | — | — | — |

9. Evaluation 9-1. Dispersion Stability

By using the ink jet composition of each of the above Examples and Comparative Examples, the average particle diameter of the particles contained in the ink jet composition immediately after the manufacturing thereof was compared with the average particle diameter of the particles contained in the ink jet composition obtained after the ink jet composition was stored in a hot environment, that is, was left in a constant-temperature bath at 60° C. for 5 days, and the evaluation was performed in accordance with the following criteria. As the change in average particle diameter is smaller, the dispersion stability is regarded as superior. Level B or higher was assumed to be an acceptable level. In addition, for the particle size measurement, a zeta-potential/particle diameter measurement device ELSZ-1000 (manufactured by Otsuka Electronics Co., Ltd.) was used.

A: Increase in particle diameter (D50%) after hot storage is less than 2.5%.
B: Increase in particle diameter (D50%) after hot storage is 2.5% to less than 5%.
C: Increase in particle diameter (D50%) after hot storage is 5% to less than 7.5%.
D: Increase in particle diameter (D50%) after hot storage is 7.5% to less than 10%.
E: Increase in particle diameter (D50%) after hot storage is 10% or more.

9-2. Color Development Property

After the ink jet composition of each of the above Examples and Comparative Examples was filled in a cartridge of a recording apparatus PX-M860F (manufactured by Seiko Epson Corporation) and was then set in the recording apparatus, the ink jet composition was ejected to form a predetermined pattern using high-quality paper functioning as a recording medium.

The color development property of the recorded matter thus obtained was evaluated. In particular, after the chromaticity of a portion to which the ink jet composition was adhered in the manufacturing process of each recorded matter was measured in the L*a*b* color space using i1 (manufactured by X-rite), and the OD value of the portion of the recorded matter to which the ink jet composition was adhered was obtained, the evaluation was performed in accordance with the following criteria. As a* is higher, or the OD value is higher, the color development property is regarded as superior. Level B or higher was assumed to be an acceptable level.

A: a* is 75 or more, and OD value is 1.0 or more.
B: a* is 65 to less than 75, and OD value is 1.0 or more.
C: a* is 55 to less than 65, and OD value is 1.0 or more.

D: a* is 0 to less than 55, and OD value is 1.0 or more.
E: a* is 0 to less than 55, and OD value is less than 1.0.

The evaluation results described above are collectively shown in Table 5.

TABLE 5

|  | DISPERSION STABILITY | COLOR DEVELOPMENT PROPERTY |
|---|---|---|
| EXAMPLE 1 | A | A |
| EXAMPLE 2 | A | A |
| EXAMPLE 3 | A | A |
| EXAMPLE 4 | A | A |
| EXAMPLE 5 | A | A |
| EXAMPLE 6 | A | B |
| EXAMPLE 7 | B | A |
| EXAMPLE 8 | B | A |
| EXAMPLE 9 | A | B |
| EXAMPLE 10 | B | B |
| EXAMPLE 11 | B | B |
| EXAMPLE 12 | B | B |
| EXAMPLE 13 | B | B |
| EXAMPLE 14 | B | A |
| EXAMPLE 15 | B | B |
| COMPARATIVE EXAMPLE 1 | E | D |
| COMPARATIVE EXAMPLE 2 | D | E |
| COMPARATIVE EXAMPLE 3 | E | E |
| COMPARATIVE EXAMPLE 4 | E | D |

As apparent from Table 5, excellent results were obtained in the above Examples of the present disclosure. On the other hand, in Comparative Examples, satisfactory results were not obtained.

Except for that the colorant was changed to C.I. Solvent Blue 5 which was an oil dye, ink jet compositions were manufactured in manners similar to those of the above Examples and Comparative Examples and were then evaluated in a manner similar to that of the above "9-2", and results similar to those described above were obtained. In addition, by using a cotton cloth as the recording medium and a PX-M860F (manufactured by Seiko Epson Corporation) as the recording apparatus, recorded matters were each formed by a heat treatment at 150° C. for 5 seconds performed such that an iron as a heating member was brought into contact with a surface side of the recording medium to which the ink jet composition was applied and were then evaluated in a manner similar to that in the above "9-2", and results similar to those described above were obtained.

Furthermore, except for that the heating temperature in the heating step was changed in a range of 100° C. to 160° C., and the heating time was changed in a range of 0.2 to 300 seconds, recorded matters were manufactured in manners similar to those described above and were then evaluated in a manner similar to that of the above "9-2", and results similar to those described above were obtained.

What is claimed is:

1. An ink jet composition comprising:
   water;
   a polyester resin having sulfo groups;
   a colorant; and
   a high molecular weight dispersant having anionic groups,
   wherein the colorant is contained in particles formed from a material containing the polyester resin, and
   a rate X1 [percent on molar basis] of the sulfo groups to all constituent monomers of the polyester resin is lower than a rate X2 [percent on molar basis] of the anionic groups to all constituent monomers of the high molecular weight dispersant.

2. The ink jet composition according to claim 1,
   wherein the colorant includes at least one selected from the group consisting of a sublimation dye, an oil dye, and a dispersive dye.

3. The ink jet composition according to claim 1,
   wherein the polyester resin has a number average molecular weight of 4,000 to 20,000.

4. The ink jet composition according to claim 1,
   wherein the X1 is 0.5 to 2.5 percent on molar basis.

5. The ink jet composition according to claim 1,
   wherein the anionic groups are sulfo groups or carboxy groups.

6. The ink jet composition according to claim 1,
   wherein the high molecular weight dispersant has a number average molecular weight lower than a number average molecular weight of the polyester resin.

7. The ink jet composition according to claim 1,
   wherein a content of the high molecular weight dispersant with respect to 100 parts by mass of the polyester resin is 5 to 25 parts by mass.

8. The ink jet composition according to claim 1,
   wherein the high molecular weight dispersant is a polyester-based high molecular weight dispersant having sulfo groups as the anionic groups, and
   the X2 is 4.0 to 7.5 percent on molar basis.

9. An ink jet recording method comprising:
   an ejection step of ejecting the ink jet composition according to claim 1 by an ink jet method.

10. The ink jet recording method according to claim 9, further comprising, after the ejection step:
    a heating step of heating a recording medium to which the ink jet composition is adhered.

11. The ink jet recording method according to claim 10,
    wherein the recording medium has a temperature of 100° C. to 160° C. in the heating step.

12. An ink jet composition comprising:
    water;
    a polyester resin having sulfo groups;
    a colorant; and
    a high molecular weight dispersant having anionic groups,
    wherein the high molecular weight dispersant having anionic groups has a number average molecular weight of 500 to 2800,
    the colorant is contained in particles formed from a material containing the polyester resin, and
    a rate X1 [percent on molar basis] of the sulfo groups to all constituent monomers of the polyester resin is lower than a rate X2 [percent on molar basis] of the anionic groups to all constituent monomers of the high molecular weight dispersant.

* * * * *